(12) United States Patent
Cragun et al.

(10) Patent No.: US 8,516,111 B2
(45) Date of Patent: Aug. 20, 2013

(54) SYSTEM FOR ENABLING RICH NETWORK APPLICATIONS

(75) Inventors: Brian J. Cragun, Rochester, MN (US); John E. Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/402,990

(22) Filed: Feb. 23, 2012

(65) Prior Publication Data
US 2012/0158961 A1 Jun. 21, 2012

Related U.S. Application Data

(62) Division of application No. 12/476,494, filed on Jun. 2, 2009.

(51) Int. Cl.
*G06F 15/173* (2006.01)

(52) U.S. Cl.
USPC .......................................... 709/224; 717/130

(58) Field of Classification Search
USPC ........................................................ 709/224
See application file for complete search history.

(56) References Cited

U.S. PATENT DOCUMENTS

| | | | | |
|---|---|---|---|---|
| 6,731,314 B1 * | 5/2004 | Cheng et al. | ................... | 715/848 |
| 6,859,834 B1 | 2/2005 | Arora et al. | | |
| 7,614,052 B2 * | 11/2009 | Wei | ............................... | 717/176 |
| 2003/0018834 A1 | 1/2003 | Eilers et al. | | |
| 2003/0140308 A1 | 7/2003 | Murthy et al. | | |
| 2006/0074683 A1 * | 4/2006 | Betarbet | ..................... | 704/270.1 |
| 2006/0277109 A1 | 12/2006 | Kerth et al. | | |
| 2007/0038649 A1 | 2/2007 | Agrawal et al. | | |
| 2007/0226082 A1 | 9/2007 | Leal | | |
| 2007/0245340 A1 | 10/2007 | Cohen et al. | | |
| 2008/0077809 A1 * | 3/2008 | Hayler et al. | .................. | 713/193 |
| 2008/0077981 A1 * | 3/2008 | Meyer et al. | ..................... | 726/12 |
| 2008/0077983 A1 * | 3/2008 | Meyer et al. | ..................... | 726/12 |
| 2008/0313728 A1 * | 12/2008 | Pandrangi et al. | ............... | 726/12 |
| 2009/0070190 A1 | 3/2009 | Gorty et al. | | |
| 2009/0138858 A1 * | 5/2009 | Livshits et al. | ............... | 717/130 |
| 2009/0287617 A1 | 11/2009 | Schmidt | | |
| 2010/0306366 A1 | 12/2010 | Cragun et al. | | |
| 2011/0047611 A1 * | 2/2011 | Hayler et al. | ..................... | 726/12 |
| 2012/0137213 A1 * | 5/2012 | Hayler et al. | .................. | 715/239 |

OTHER PUBLICATIONS

Building Rich Web Applications with Ajax Linda Dailey Paulson freelance technology writer, Ventura, California, Oct. 2005.*
Wikipedia, Rich Internet application, Wikipedia, the free encyclopedia, Mar. 7, 2011, <http://en.wikipedia.org/wiki/Rich_Internet_application>.
Cohen, Stessa B. et al., Banks Eye Rich Internet Applications to Replace Web Applications, Gartner: Industry Research, Dec. 12, 2005, Gartner, Inc., Stamford, CT, United States.

(Continued)

*Primary Examiner* — Tauqir Hussain
(74) *Attorney, Agent, or Firm* — Patterson & Sheridan LLP (57) ABSTRACT

The present invention generally provides methods, systems and articles of manufacture that provide an autonomous system for enabling rich network applications. Embodiments of the invention may monitor an existing network application and generate a profile on the network application based on what responses and data updates are triggered by various requests from a user. Embodiments of the invention may refactor the existing network application into a rich network application based on the profile created for that network application.

12 Claims, 5 Drawing Sheets

(56) References Cited

OTHER PUBLICATIONS

Getting Started with Web Applications, the J2EE 1.4 Tutorial, <http://docs.oracle.com/javaee/1.4/tutorial/doc/WebApp.html>, Mar. 30, 2011.

Wikipedia, Model-view-controller, Wikipedia, the free encyclopedia, Mar. 29, 2011, <http://en.wikipedia.org/wiki/Model-view-controller>.

* cited by examiner

SYSTEM FOR ENABLING RICH NETWORK APPLICATIONS

BACKGROUND OF THE INVENTION

1. Field of the Invention

Embodiments of the invention generally relate to refactoring existing network applications into rich internet applications. More specifically, embodiments of the invention provide a method for monitoring and profiling an existing network application and based on that profile refactoring the network application into a rich network application.

2. Description of the Related Art

A common challenge with internet application development is providing a user with a rich and responsive user interface. Due to the latency in web environments, it is difficult to duplicate the responsiveness of a fat client (i.e., a client application executing locally). Currently, some existing techniques allow developers to work around these problems and create rich internet applications. For example, Asynchronous JavaScript and XML (AJAX) is a technique gaining popularity among developers. Using AJAX, web pages are manipulated at the client to improve the user's experience by updating only certain parts of the page programmatically via JavaScript. The result is that the page does not have to completely refresh after every request to the server, which saves network bandwidth and provides a more responsive user interface.

However, AJAX represents a fundamentally different approach from traditional internet application development, and has a steep learning curve for developers. For this reason, AJAX (and other related techniques) have not been fully embraced by development teams that cannot take on the additional learning curve or risk application stability by re-architecting their code for AJAX. As is usually the case with adoption of new technology, change is weighed against several factors, which may include time to implement, cost, and quality assurance. However, internet applications without rich client responsiveness cannot compete as well with their AJAX-wielding counterparts.

SUMMARY OF THE INVENTION

One embodiment of the invention includes a computer-implemented method of refactoring a web-based application. The method may generally include monitoring a plurality of requests received from a client application interacting with the web-based application and monitoring a generated response for each of the plurality of requests. Each response may provide a markup-language document generated in response to the request and is transmitted to the client application for rendering. The method may also include identifying at least one pattern between the plurality of requests and the generated responses. Typically, the identified pattern may show a correlation between a first request and a corresponding generated response. The method may also include refactoring the web-based application based on the at least one pattern. The refactoring may include generating a server component and a client component. The server component may be configured to generate a portion of one of the markup-language documents. The client component may be embedded in the markup-language document generated for a first request. Further, the client component may be configured to invoke the server component to update at least a portion of the markup-language document corresponding to the first request.

Another embodiment of the invention includes a computer-readable storage-medium containing a program which, when executed on a processor, performs an operation for refactoring a web-based application. The operation may generally include monitoring a plurality of requests received from a client application interacting with the web-based application and monitoring a generated response for each of the plurality of requests. Each generated response may provide a markup-language document generated in response to the request and is transmitted to the client application for rendering. The operation may also include identifying at least one pattern between the plurality of requests and the generated responses. The pattern may show a correlation between a first request and a corresponding generated response. The operation may also include refactoring the web-based application based on the at least one pattern. The refactoring may include generating a server component and a client component. The server component may be configured to generate a portion of one of the markup-language documents. The client component may be embedded in the markup-language document generated for a first request. Further, the client component may be configured to invoke the server component to update at least a portion of the markup-language document corresponding to the first request.

Still another embodiment of the invention includes a system having a processor and a memory containing a program, which when executed by the processor, performs an operation for refactoring a web-based application. The operation may generally include monitoring a plurality of requests received from a client application interacting with the web-based application and monitoring a generated response for each of the plurality of requests. Each generated response may provide a markup-language document generated in response to the request and is transmitted to the client application for rendering. The operation may also include identifying at least one pattern between the plurality of requests and the generated responses. The pattern may show a correlation between a first request and a corresponding generated response. The operation may also include refactoring the web-based application based on the at least one pattern. The refactoring may include generating a server component and a client component. The server component may be configured to generate a portion of one of the markup-language documents. The client component may be embedded in the markup-language document generated for a first request. Further, the client component may be configured to invoke the server component to update at least a portion of the markup-language document corresponding to the first request.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention generally provide a system, method and article of manufacture for monitoring and refactoring, or guiding a user through refactoring, an existing internet application into a rich internet application. The "rich internet application" may take advantage of a variety of technologies to enhance the responsiveness (i.e., reduce the latency) of a web-based application. Generally, a web application is deployed on the web server—allowing users to access the application as a web-site. To a user interacting with a web browser, the web application is presented as a series of web-pages. On the server however, an application server may generate content for web pages on the fly, provide persistence from page-to-page or session-to-session, and interact with databases or other application programs in order to present the web application to a user. Typically, however, each time a user interacts with the web application (e.g., submits a "get" request for a page or an http "post" message submitting the contents of a form), a complete web page is generated and transmitted to the client for rendering.

Embodiments of the invention may evaluate the behavior (and content) of such a web-application in order to refactor the web application to use more responsive techniques for presenting the web application to users, generally referred to as a "rich internet application." For example, a Request Profiling Program (RP Program) installed on a computer system hosting a web application may monitor incoming requests and outgoing responses (e.g., http requests and responses) and refactor the internet application based on those requests and responses. Generally, the RP Program may refactor the existing internet application by modifying client web pages and creating corresponding server pages to take advantage of techniques such as AJAX (or other rich internet application development techniques). More generally, refactoring refers to a process of modifying the implementation of a software application without changing its existing functionality. In context of the present invention, a web-based application may be refactored to improve the responsiveness of the web-based application.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the computing environment 100 shown in FIG. 1 and described below. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
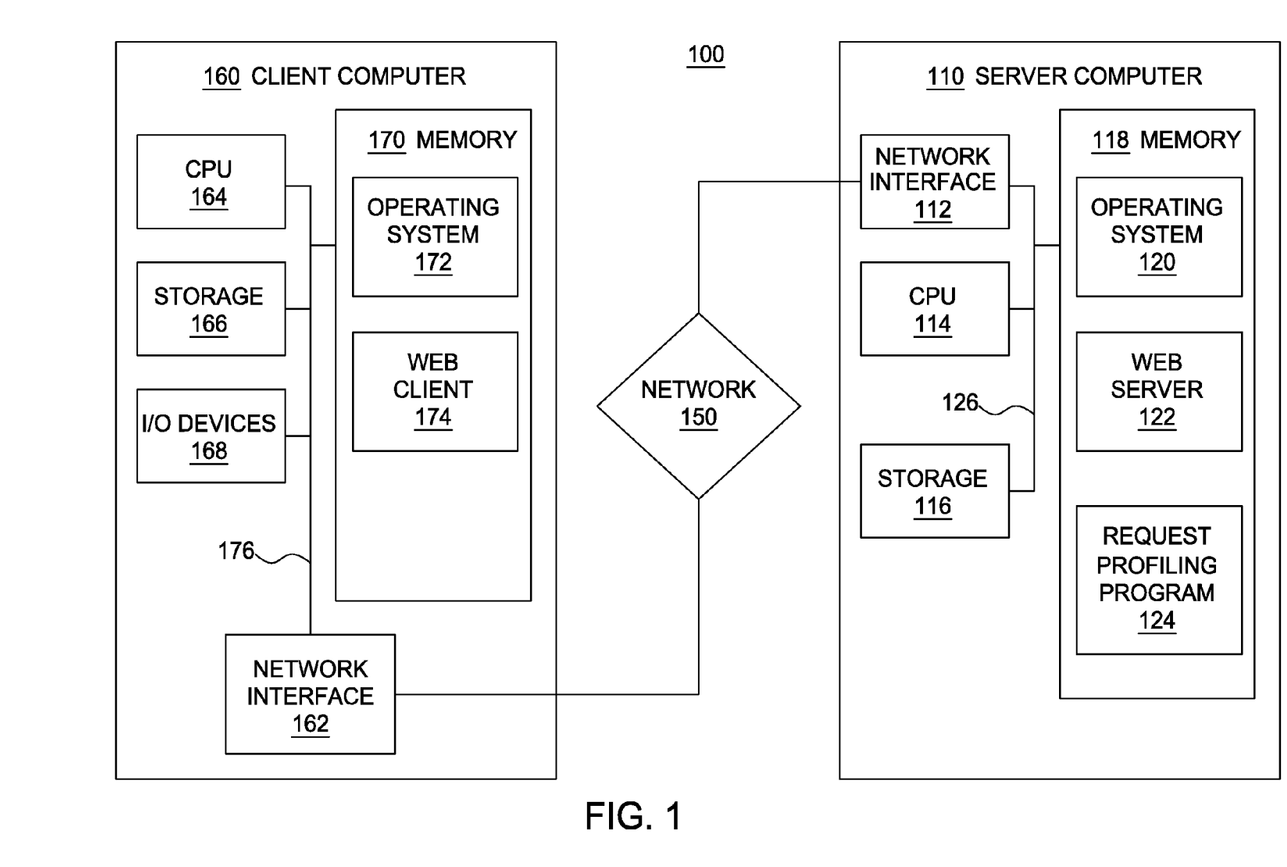
FIG. 1 illustrates an exemplary computing environment, according to one embodiment of the invention.

FIG. 1 is a block diagram illustrating an exemplary computing environment 100, according to one embodiment of the invention. As shown, the computing environment 100 includes a client computer 160 and a server computer 110. The client computer 160 and the server computer 110 may be components of the same computer system or may be connected via a network 150, such as the Internet.

As shown, the client computer 160 includes a central processing unit (CPU) 164 connected to a memory 170, storage 166, and input device and output devices 168 via a bus 176. CPU 164 is included to be representative of a single CPU, multiple CPUs, a single CPU having multiple processing cores, and the like. Storage 166 stores application programs and data for use by the client computer system 160. Examples of storage 166 include one or more hard-disk drives, flash memory devices, optical media and the like. The client computer 160 may be connected to a data communications network 150 (e.g., a local area network, which itself may be connected to other networks such as the internet).

Memory 170 can be one or a combination of memory devices, including random access memory, nonvolatile or backup memory, (e.g., programmable or flash memories, read-only memories, etc.). Additionally, the client computer 160 may include input/output devices 168 such as a mouse, keyboard and monitor, as well as a network interface 162 used to connect client computer 160 to network 150.

Illustratively, the memory 170 of the client computer 160 stores an operating system 172 used to manage hardware and software executing on the client computer 160. As shown, memory 170 also includes a web client 174 which, when executed by CPU 164, provides support for navigating between various servers and locating network resources at one or more of servers (e.g., server computer 110).

Similar to the client computer 160, the server computer 110 generally includes a CPU 114, a memory 118, a network interface device 112, and a storage device 116, coupled via a bus 126. Memory 118 is a random access memory sufficiently large to hold the necessary programming and data structures that are located on the monitored computer 110. As shown, memory 118 stores an operating system 120 used to manage server hardware and software executing on the monitored computer 110. Additionally, memory 118 also stores a database 128.

Illustratively, memory 118 also includes a hypertext transfer protocol (http) web server process 122 configured to service requests from the client computer 160. For example, process 122 may respond to requests for access to electronic resources (e.g., HTML documents, network information, and the like) residing on the server 110. However, one of ordinary skill in the art will recognize that the web server process 122 is merely illustrative and embodiments of the invention may be adapted to support both known and unknown protocols. The programming and data structures of the web server process 122 may be accessed and executed by the CPU 114 as needed during operation. The server computer 110 may also include a network interface device 112 connecting server computer 110 to the network 150. (e.g., an analog modem, a wired network card, or a wireless network device).

In one embodiment, the RP Program 124 may monitor for incoming requests for an electronic resource (e.g., an HTML document) received by the http web server process 122. For example, a user may visit a website hosted on the server computer 110 using the web client 174 running on the client computer 160. In such an example, the RP Program 124 monitors the request received by the web server process 122. Additionally, the RP Program 124 may monitor which web pages are served to the web client 174 by the web server process 122 in response to the request. That is, when the web server process 122 builds and sends a web page in response to a request from a web client 174, the RP Program 124 monitors this response and the contents of the response. Additionally, the RP Program 124 may store requests and responses and their related data in association with one another. For example, when a request is sent to the web server process 122, the RP Program 124 stores a copy of not only the request and its contents, but also the web pages served by the web server process 122 in response to the request.

In addition to storing the requests and responses, the RP Program 124 monitors what data the web server 122 accesses to build the response web page. For instance, the web server process 122 may dynamically generate the response web page by use of a JavaServer Page (JSP). A JSP is a Java tool that enables dynamic generation of HTML, XML or other types of documents in response to a web client request. In this example, the JSP may use data from a JavaBean in building the response web page. The RP Program 124 monitors which JavaBeans and other data are used to build the response page and maintains this information in association with the request and its contents.

By associating the request with the response and the data used to generate the response, the RP Program 124 may profile the requests to detect patterns in the responses and in the data referenced to construct the responses. For instance, the request may be for a web page for navigating through a table of query results. The web server process 122 may construct the response web page by use of a JSP, which may reference a JavaBean to extract the data used to populate the table of query results. The RP Program 124 may determine that every time the web server process 122 receives the request for this page, the same JavaBean (i.e., the same data store) is referenced to construct the response web page.

By detecting these patterns, the RP Program 124 may refactor the web page and the server-side code to provide a thinner layer of access to the JavaBean referenced by the JSP. For instance, to refactor an existing web page, the RP Program 124 may generate a server-side AJAX servlet which accepts requests to access data on the server computer 110. Additionally, the RP Program 124 may generate corresponding client-side code in the web page to reference the newly created servlet. In this example, the resulting refactored webpage may update data in the table of query results directly from the JavaBean. By refreshing only the updated data on the web page, the refactored webpage avoids redundantly reloading unchanging sections of the web page. This results in a richer and more responsive web page.

Figure 2:
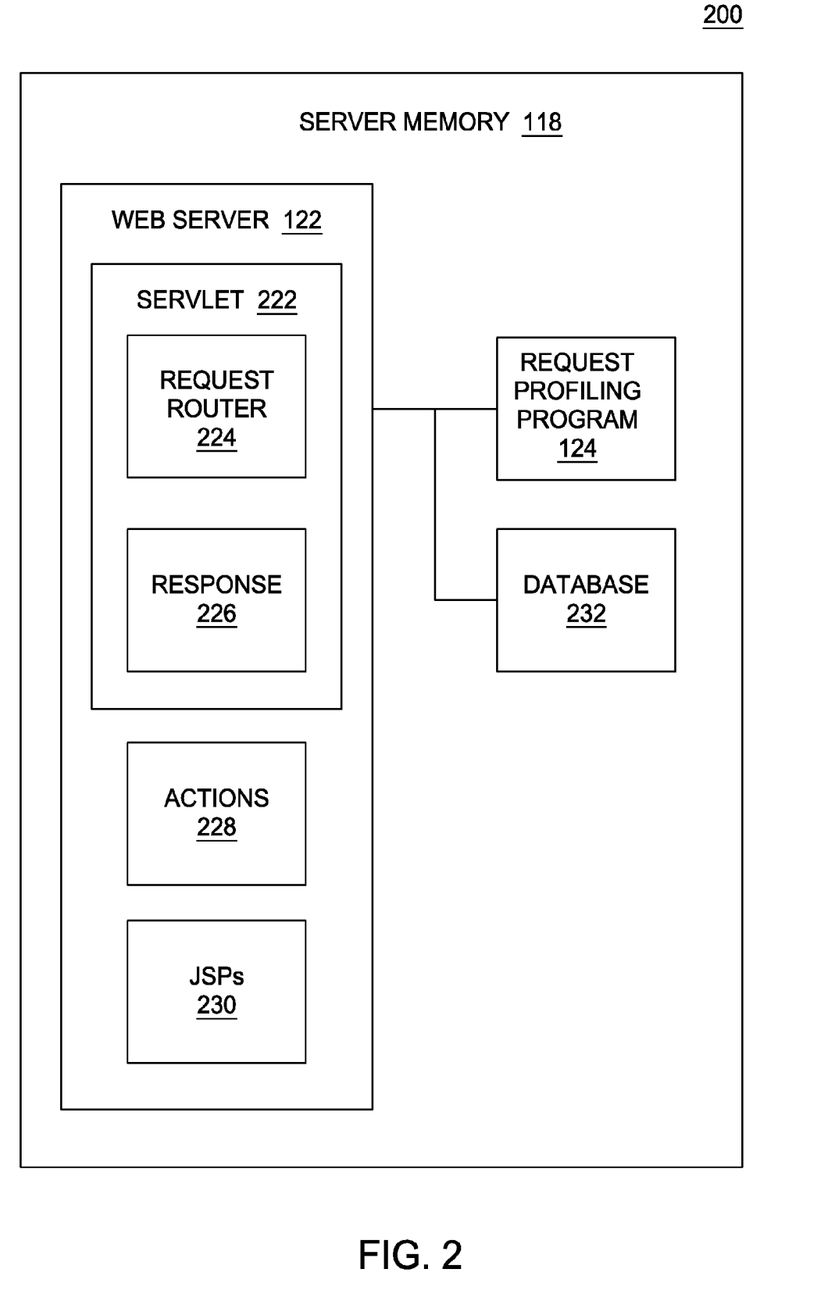
FIG. 2 is a block diagram further illustrating the components of the server memory first shown in FIG. 1, according to one embodiment of the invention.

FIG. 2 is a block diagram further illustrating the components of the Server Memory first shown in FIG. 1, according to one embodiment of the invention. As shown, the server memory 118 contains a web server 122, a RP Program 124 and a database 128.

In this example, the web server 122 is a Java 2 Enterprise Edition (J2EE) web application, containing servlets 222, actions 228 and JSPs 230. While the web application in FIG. 2 is a J2EE web application, one of ordinary skill in the art will recognize that this is merely illustrative and embodiments of the invention may be adapted to support both known and unknown web application paradigms. When the web server process 122 receives a request from a web client 174, the web server 122 may send that request to a servlet 222 on the web server computer 110.

The servlet 222 is a Java programming language class that dynamically processes requests and constructs responses. The servlet 222 may contain a request router 224 and a response 226. The request router 224 may map an incoming request to a corresponding server-side action 228 containing the appropriate business logic for processing the request. For instance, when the servlet 222 receives a request to reload a table on a web page, the servlet 222 may call a RefreshAction method to handle the request (e.g., an action designed specifically for the task). The servlet 222 may send the response 226 to the web server 122, which in turn may serve the updated web page to the web client 174.

The action 228 may store incoming data persistently (e.g., in a user session) as a result of processing a request sent from the web client 174 on the client computer 160. For example, when the web server 122 receives a request for a web page, the web server 122 sends that request to the servlet 222. If the servlet's 222 request router 224 then determines that the request contains data that needs to be persisted, the request router 224 may use the appropriate action 228 to store incoming data in, for instance, a JavaBean. The action 228 may also read data from a data source, such as the database 128. That is, the servlet 222 may call an action 228 that reads data from the database 128 and stores that data in a JavaBean.

The action 228 may also determine which web page the web server should serve next. While the selected web page may be an ordinary HyperText Markup Language (HTML) page, the next page may also be a JSP 230, as shown here. The JSP 230 may read appropriate data from a data store, such as the database 128 or from a JavaBean, and use this data to dynamically construct the next web page to be served.

As an example, the web server process 122 may receive a request from a web client 174 for the contents of an online shopping cart. The web server process 122 may pass this request on to the servlet 222. The servlet's 222 request router 224 then may determine the appropriate action 228 and may submit the request to that action 228. Continuing the example, the action 228 may determine that the JSP 230 used to generate a web page showing the shopping cart items should be executed next. The JSP 230 may then read the contents of the user's shopping cart from the data store, which may be a JavaBean, the database 128, or another data source, and may use this data to dynamically build the response 226. The servlet then submits the response 226 to the web server 122, which in turn serves this web page to the web client 174 on the client computer 160. Finally, the web client 174 may display the contents of the user's online shopping cart.

In one embodiment, the RP Program 124 may observe the behavior of an existing web application in order to identify how it may be refactored. Once the RP Program 124 profiles the web application, the RP Program 124 may refactor the web application into a rich web application. By refactoring the web application, the RP Program 124 may improve the responsiveness of the web application, decrease bandwidth usage and improve the overall user interface of the web application. For example, the RP Program 124 may monitor requests sent to the servlet 222 and intercept these requests.

After intercepting the request, the RP Program 124 may classify the request to determine the type of request and the type of user interface element that generated the request. The RP Program 124 may also monitor any data stored persistently by the actions 228, as well as identify which portions of the response web page differ from the previous web page viewed by the web client 174. For example, when a request is sent to the servlet 222 for a web page, containing a menu bar and a second page of query results, the RP Program 124 may intercept the request. The RP Program 124 may classify this request as a request to update a page of query results, and note which, if any, JavaBeans and JavaBean fields are updated as the request processes. In this example, the RP Program 124 may detect an update in the JavaBean containing the current page of query results. The RP Program 124 may also detect which portion of the web page changed as a result of the request. Returning to the example, the RP Program 124 may detect that the portion of the web page containing the query results changed. By monitoring the incoming requests and their corresponding responses, along with what server-side data was changed by the incoming requests, the RP Program 124 may effectively learn which parts of the web pages can be refactored to take advantage of AJAX or other responsive UI techniques.

Figure 3:
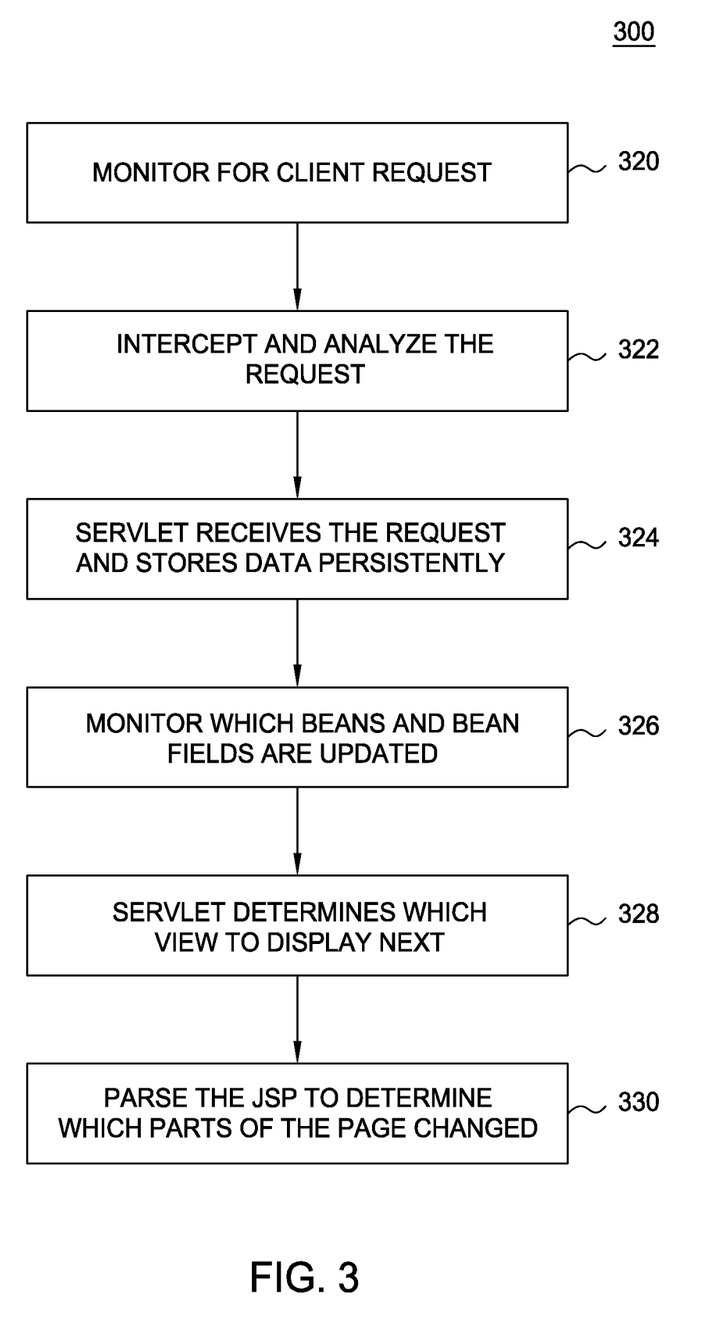
FIG. 3 is a flow chart illustrating a method for refactoring an existing internet application, according to one embodiment of the invention.

FIG. 3 is a flow chart illustrating a method 300 for refactoring an existing internet application, according to one embodiment of the invention. While the method 300 illustrates an approach using a Java 2 Enterprise Edition (J2EE) web application and AJAX as examples, one of ordinary skill in the art will recognize that such a web application is merely illustrative and embodiments of the invention may be adapted to support both known and unknown web application paradigms. As shown, the method 300 begins at step 320, where the RP Program 124 may monitor for incoming client requests or activity. That is, the RP Program may monitor a user interacting with a web page on the web server 122. At step 322, the RP Program 124 may detect and intercept the request. The RP Program 124 may intercept the request before it is received by the appropriate servlet 222 on the webserver 122.

Once a request has been intercepted, the RP Program 124 may analyze and classify the type of the request. The RP Program 124 may classify the type of the request by evaluating the query parameters of the request. For example, where the request submitted by the user is a form containing several form fields, the RP Program 124 may classify and store the information contained in the form fields to assist in identifying the type of the request.

The RP Program 124 may also classify requests by identifying the type of user interface element that was used to produce the request. To identify the type of user interface element, the RP Program 124 may evaluate the HTML markup of the web page to detect common elements, such as scrollable tables, menus, navigation trees, etc. The RP Program 124 may identify common elements that match predefined HTML patterns, or may identify elements generated by a program or a toolkit. For example, if the request was generated by a user clicking on a scrollable table, the RP Program 124 may analyze the source of the web page and classify the request as one generated by a scrollable table.

In one embodiment, the RP Program 124 may classify requests in order to detect patterns between the incoming request generated by the web client 174 and the outgoing response sent by the web server 122, as well as changes or reference to any server-side data. Additionally, identifying which user interface element generated the request may be important in limiting the parts of the web page affected by generated AJAX code.

At step 324, the request is passed on to the appropriate servlet 222 on the web server 122. As discussed above, the servlet 222 may invoke one or more actions 228 to store data persistently in a user session (e.g., by invoking methods associated with classes configured to process requests on behalf of the servlet). At step 326, the RP Program 124 monitors the servlet to see which actions 228 are used and which, if any, data fields are updated. For instance, if an incoming request is a user adding an item to his online shopping cart, the servlet 222 may call actions 228 to modify one or more JavaBean fields inside the JavaBean designated for storing the contents of the user's online shopping cart. In such a scenario, the RP Program 124 may monitor which actions 228 were called and store information on which JavaBeans and JavaBean fields the actions 228 modified. As a second example, the servlet 222 may call an action 228 to read the product information on the item from the database 128. Here, the RP Program 124 may monitor which action 228 was called and what database 128 fields were accessed. By monitoring and storing this information, the RP Program 124 may detect patterns from multiple incoming requests, outgoing responses and which data was modified. These patterns may be in turn used in refactoring the internet application into a rich internet application.

At step 328, the servlet 222 determines which web page to display next. For example, the servlet 222 may determine that a JSP 230 is the appropriate next web page to generate and serve. The JSP 230 may read data from the database 128, JavaBeans (or from another data source) to dynamically generate the next web page for the user.

At step 330, once the JSP 230 has finished reading the appropriate data and the response 226 has been built, the RP Program 124 may parse the resulting webpage to determine which parts have changed. The RP Program 124 may determine which sections changed based on which JavaBeans were updated previously in step 326. For example, the RP Program 124 may determine that JavaBean ExampleBean was updated previously in step 326, and that now the JSP 230 is also referencing ExampleBean. Based on this determination, the RP Program 124 may deduce that the request, originally generated by the user, needs access to the JavaBean ExampleBean and, based on which part of the JSP 230 references ExampleBean, updates a certain area of the web page. For example, if only a table in the JSP 230 references ExampleBean, the RP Program 124 may determine that only this table needs to be updated based on this request.

In addition, the RP Program 124 may determine whether other parts of the web page generated by the JSP 230 not directly related to the updated JavaBean data were updated in response to a request. The RP Program 124 may accomplish this by comparing the response page's markup to a previous response page's markup from the same or a similar request. For example, if the user's request was to scroll (or clicks a button labeled "next", etc.) to the next page in a set of search results, the RP Program 124 may determine that a particular JavaBean was updated, and that the JavaBean corresponds to a particular table in the web page generated from the JSP 230. However, after doing a request to request comparison, the RP Program 124 may determine that the page's header content was also updated. Therefore, the RP Program 124 may infer that the request triggered more than just the search result table's data to change. Thus, when refactoring the web application, the RP Program 124 knows that not only does this request cause the table to be updated, but also the page's header content to be updated as well.

After profiling the internet application, the RP Program 124 may refactor the internet application. At step 332, if the RP Program 124 determines that no markup in the JSP 230 changed (i.e., only data, such as the JavaBeans, changed), then the RP Program 124 may generate a new AJAX servlet. The RP Program 124 may also generate client-side AJAX code to reference the new AJAX servlet. The generated AJAX servlet may accept requests from the corresponding AJAX client-side code to access data on the server. For instance, if the RP Program 124 determined in steps 326 and 330 that a request to show the next page of query results always references JavaBean ExampleBean, then the newly generated AJAX servlet may accept requests from corresponding AJAX client-side code and provide that client-side code access to ExampleBean.

The RP Program 124 may also embed generated client-side AJAX code into the refactored web page. This newly generated client-side AJAX code calls the AJAX servlet whenever this type of request is generated in the future. Continuing with the previous example, if the user now initiated a request to show the next page of query results, the embedded client-side AJAX code may interact directly with the newly generated AJAX servlet to gain access to ExampleBean. Thus, the web page may load the next page of query results without having to reload the entire web page, resulting in reduced network traffic and a richer and more responsive web page.

If the RP Program 124 determines the markup in the JSP 230 has changed (based on the request to request comparison in step 330), then the RP Program 124 may refactor the JSP into appropriate partitions based on its profile of the request. Put another way, based on the information gathered in steps 322, 326 and 330, the RP Program 124 may partition the JSP 230 into the appropriate sections. For example, if the RP Program 124 determines that the page header and the search results table are both updated by a given request, then the RP Program 124 may split the JSP 230 into three separate files—one for the header, one for the search results table, and one for the rest of the page content.

Once the RP Program 124 has partitioned the page, the RP Program 124 may generate both server-side code and client-side code. The RP Program 124 may embed this client-side code in the corresponding web page (i.e., the web page that initially triggered the request in step 322). That is, the RP Program may generate both a server-side AJAX servlet and client-side AJAX code, and embed the client-side AJAX code in the appropriate web page. The newly generated server-side code may accept requests from the corresponding newly generated client-side code. For instance, the AJAX servlet may accept requests directly from corresponding AJAX client-side code. The newly generated server-side code may also accept requests from the corresponding client-side code to access the appropriate web page partition. In other words, the embedded client-side AJAX code calls the generated AJAX servlet to retrieve content rendered from the appropriate page partition(s) whenever this type of request occurs in the future. For instance, in the example where the page header and search results table were partitioned into separate files, recall that these two sections were partitioned off from the rest of the JSP 230 because only these two sections updated when this particular request was sent. In that example, the client-side AJAX code may directly call the AJAX servlet, which would in turn render only code corresponding to the page header partition and the search results table partition. The RP Program 124 may generate the client-side AJAX in such a way that it knows which elements on the web page correspond to the updated partitions, and accordingly would only update those sections. Thus, when the web client 174 sends this request in the future, the web server 122 will not render the response from the JSP and refresh the entire page, but rather the newly generated client-side code will communicate directly with the server-side code to obtain the necessary data. In short, only the necessary sections of the page will be updated, resulting in less network traffic and a more responsive user interface.

Figure 4:
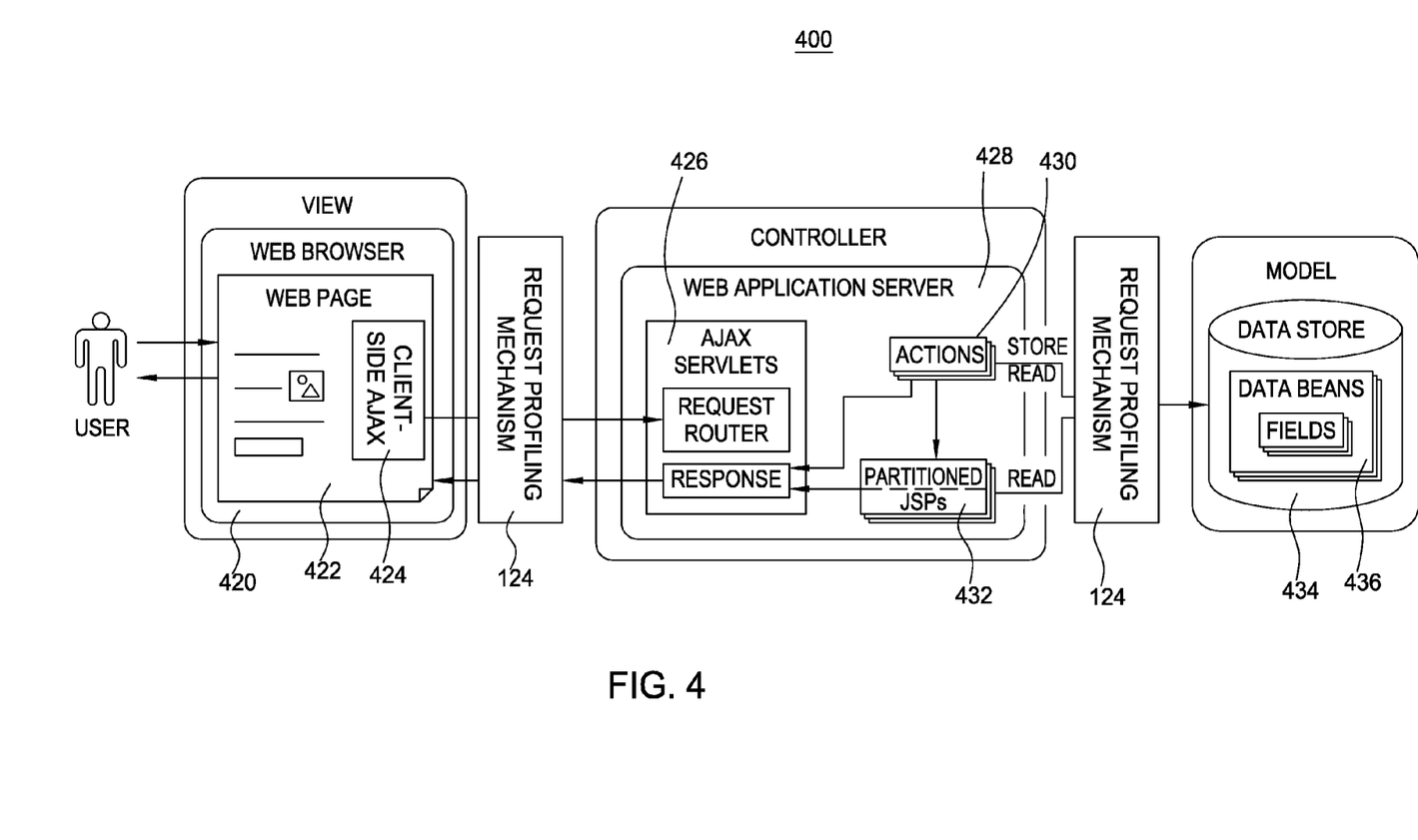
FIG. 4 is a model-view-controller diagram illustrating a refactored internet application, according to one embodiment of the invention.

FIG. 4 is a model-view-controller diagram illustrating a refactored internet application 400, according to one embodiment of the invention. As shown, the view consists of a web browser 420, which is displaying a web page 422 containing the generated client-side AJAX code 424. When the user interacts with the web page 422, the web browser 420 sends a request to the controller, or more specifically here, the web application server 428. Although the original web application would proceed to call actions and completely rebuild the response from a JSP, the refactored application using the client-side AJAX code 424 communicates directly with the generated server-side AJAX servlets 426.

The AJAX servlets 426 then use the actions 430 to store and retrieve data from the data store 434 (i.e., the model), which here consists of JavaBeans 436. If data is all that is required to update the web page 422, then the appropriate data is then returned to the web browser 420 via the AJAX servlet's 426 response. In this case, the client-side AJAX code 424 then uses the data contained in the response to update the appropriate page elements on the web page 422. The result is the refactored application may update specific elements on the web page 422 without having to update everything, thus using less bandwidth and creating a more responsive web page 422 for the user.

In another case, the client-side AJAX code 424 initiates a request to retrieve certain page partitions needed for the current web page 422. Here, the server-side AJAX servlet 426 again calls one or more actions 430 to perform the appropriate business logic and to update data in the data store 434. However, in this case, rather than responding with either an entirely new web page to display or simply with updated data, the action 430 uses the partitioned JSPs 432 and responds only with the necessary partitions. The web browser 420 can then use the partitions in the response to update only the relevant parts of the web page 422. Thus, the refactored web application updates only the sections of the web page 422 that have been modified, and avoids redundantly refreshing any unchanged content.

Figure 5:
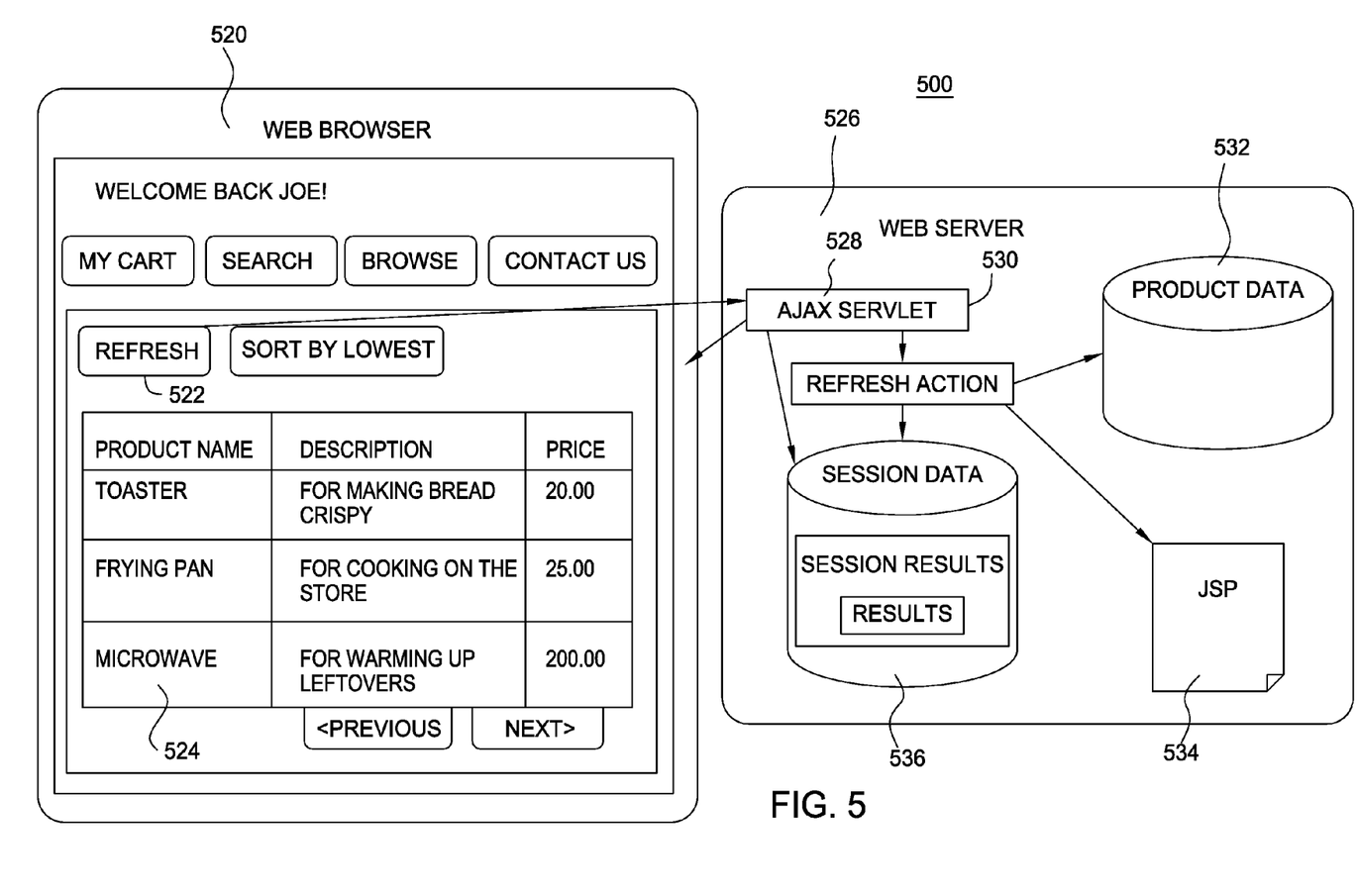
FIG. 5 illustrates a refactored internet application, according to one embodiment of the invention.

FIG. 5 illustrates a refactored internet application 500, according to one embodiment of the invention. As shown, the refactored internet application 500 consists of a web browser 520 containing a web page 521 for an online shopping cart. The web page 521 contains several buttons, including a refresh button 522, and also contains a table 524 displaying the contents of the online shopping cart. Here, table 524 shows that the shopping cart contains a toaster, a frying pan and a microwave. The table 524 also lists information about each item, such as a description and a price.

When the user presses the refresh button 522 in the refactored internet application, the client-side AJAX code embedded in the web page 521 communicates with server-side AJAX servlet 528 on the web server 526. The servlet 528 calls the appropriate action, here the Refresh Action 530. Note that the servlet 528 knows which action is the appropriate action to call due to the refactoring performed by the invention. Once called, the Refresh Action 530 retrieves data from a product database 532 and stores this data in the session results 536 (e.g., a search.Results JavaBean) in the user session. In the original web application, the action would proceed to select the appropriate JSP 534 and completely build the next web page with the updated data (i.e., a full page refresh). In the refactored application, however, the AJAX servlet 528 directly stores the updated session results 536 data in the response (e.g., via XML response object). The AJAX client code then receives the response from the AJAX servlet 528 and rebuilds the table 524 using the updated data. The result is that when the refresh button 522 is pressed by the user, the refactored application can fetch data from the web server 526 and rebuild the table 524 without having to reload the entire web page 521.

While the foregoing is directed to embodiments of the present invention, other and further embodiments of the invention may be devised without departing from the basic scope thereof, and the scope thereof is determined by the claims that follow.

What is claimed is:

1. A computer-implemented method for refactoring a network application, comprising:
   monitoring, by operation of one or more computer processors, a first network application, wherein the first network application includes at least one client-side component configured to interact with at least one server-side component, wherein the monitoring includes:
      intercepting a request sent from the client side component to the server side component, and
      analyzing the intercepted request to classify a request type and to determine a user-interface element that generated the request;
   passing the request to the server side component, wherein the server-side component is configured to store data included in the request persistently;
   profiling the first network application, wherein a profile is generated based on monitored interactions between the client-side component and the server-side component; and
   refactoring the first network application based on the profile, wherein the refactoring comprises:
      replacing the at least one server-side component with a refactored server-side component configured to interact with a refactored client-side component by responding to requests for portions of an interface presented by the network application, and
      replacing the at least one client-side component with the refactored client-side component, wherein the refactored client-side component is configured to update the portions of the interface presented by the network application with data supplied by the client-side component.

2. The computer-implemented method of claim 1, wherein monitoring the first network application further comprises mapping each of a plurality of incoming server-side requests generated by the client-side component to a corresponding server-side response generated by the server-side component.

3. The computer-implemented method of claim 1, wherein the request type is determined by evaluating one or more query parameters of the request.

4. The computer-implemented method of claim 1, wherein the request type is determined by identifying one or more user interface elements of the client-side component used to generate the request.

5. A computer-readable storage device containing a program which, when executed on a processor, performs an operation for refactoring a network application, the operation comprising:
   monitoring, by operation of the one or more processor, a first network application, wherein the first network application includes at least one client-side component configured to interact with at least one server-side component, wherein the monitoring includes:
      intercepting a request sent from the client side component to the server side component, and
      analyzing the intercepted request to classify a request type and to determine a user-interface element that generated the request;
   passing the request to the server side component, wherein the server-side component is configured to store data included in the request persistently;
   profiling the first network application, wherein a profile is generated based on monitored interactions between the client-side component and the server-side component; and
   refactoring the first network application based on the profile, wherein the refactoring comprises:
      replacing the at least one server-side component with a refactored server-side component configured to interact with a refactored client-side component by responding to requests for portions of an interface presented by the network application, and
      replacing the at least one client-side component with the refactored client-side component, wherein the refactored client-side component is configured to update the portions of the interface presented by the network application with data supplied by the client-side component.

6. The computer-implemented method of claim 1, wherein monitoring the first network application further comprises mapping each of a plurality of incoming server-side requests generated by the client-side component to a corresponding server-side response generated by the server-side component.

7. The method of claim 1, wherein the request type is determined by evaluating one or more query parameters of the request.

8. The method of claim 1, wherein the request type is determined by identifying one or more user interface elements of the client-side component used to generate the request.

9. A system, comprising:
a processor; and
a memory containing a program, which when executed by the processor, performs an operation for performs an operation for refactoring a web-based application, the operation comprising:
monitoring, by operation of the one or more processor, a first network application, wherein the first network application includes at least one client-side component configured to interact with at least one server-side component, wherein the monitoring includes:
intercepting a request sent from the client side component to the server side component, and
analyzing the intercepted request to classify a request type and to determine a user-interface element that generated the request;
passing the request to the server side component, wherein the server-side component is configured to store data included in the request persistently;
profiling the first network application, wherein a profile is generated based on monitored interactions between the client-side component and the server-side component; and
refactoring the first network application based on the profile, wherein the refactoring comprises:
replacing the at least one server-side component with a refactored server-side component configured to interact with a refactored client-side component by responding to requests for portions of an interface presented by the network application, and
replacing the at least one client-side component with the refactored client-side component, wherein the refactored client-side component is configured to update the portions of the interface presented by the network application with data supplied by the client-side component.

10. The system of claim 1, wherein monitoring the first network application further comprises mapping each of a plurality of incoming server-side requests generated by the client-side component to a corresponding server-side response generated by the server-side component.

11. The system of claim 1, wherein the request type is determined by evaluating one or more query parameters of the request.

12. The method of claim 1, wherein the request type is determined by identifying one or more user interface elements of the client-side component used to generate the request.

* * * * *